United States Patent [19]

Alligood

[11] Patent Number: 5,323,197
[45] Date of Patent: Jun. 21, 1994

[54] APPARATUS FOR TRANSPORTING PHOTOGRAPHIC FILM

[75] Inventor: John H. Alligood, Penfield, N.Y.

[73] Assignee: Eastman Kodak Company, Rochester, N.Y.

[21] Appl. No.: 931,226

[22] Filed: Aug. 17, 1992

[51] Int. Cl.⁵ .............................................. G03B 01/18
[52] U.S. Cl. .................................................. 354/173.1
[58] Field of Search ................ 354/173.1, 173.11, 212, 354/213, 214

[56] References Cited

U.S. PATENT DOCUMENTS

| | | | |
|---|---|---|---|
| Re. 32,558 | 12/1987 | Chan | 354/173.1 |
| 2,275,497 | 3/1942 | Berndt | 242/200 |
| 2,906,184 | 9/1959 | Hennig et al. | 354/214 |
| 4,482,226 | 11/1984 | Tamamura | 354/173.1 |
| 4,688,763 | 8/1987 | Wakabayashi et al. | 354/173.11 |

Primary Examiner—Howard B. Blankenship
Attorney, Agent, or Firm—David A. Howley

[57] ABSTRACT

A film transporting apparatus comprises a bi-directional motor adapted to rotate in a first direction and a second direction opposite the first direction; a driving gear connected to the bi-directional motor and adapted to rotate in a first direction and a second direction in response to rotation of the bi-directional motor in its first direction and its second direction, respectively; a first gear; a displaceable gear coupled to the driving gear and adapted to rotate around the driving gear along a predetermined path between a first position disengaged from the first gear and a second position engaged with the first gear in response to the driving gear rotating in its first direction and its second direction, respectively; and a mechanism for controlling the rotation of the displaceable gear between the engaged and disengaged positions. The film transport apparatus is characterized in that the controlling mechanism includes a device for creating a frictional force along the predetermined path to control the rotation of the displaceable gear around the driving gear along the predetermined path and to hold the displaceable gear in its engaged and disengaged positions.

3 Claims, 4 Drawing Sheets

5,323,197

APPARATUS FOR TRANSPORTING PHOTOGRAPHIC FILM

FIELD OF THE INVENTION

The present invention is generally directed to the field of photography and in particular to an apparatus for transporting a photographic film.

BACKGROUND OF THE INVENTION

Conventional photographic equipment generally includes a transport apparatus including a mechanism to wind-up a photographic film onto a take-up spool and a mechanism to rewind the photographic film into a photographic film supply apparatus. The transport apparatus also includes a single electric motor having a drive force transmitted to the wind-up mechanism and to the rewind mechanism. Gear trains associated with the wind-up mechanism and the rewind mechanism are common part of the way, then branch off into two routes and the drive force of the motor is transmitted selectively to one of the mechanisms by the use of swing gears or the like.

Various U.S patents disclose photographic equipment having a swing gear type of device for selectively engaging either of two gears, or two gear trains, that, in turn, drive respective film supply and take-up spools. U.S. Pat. No. 4,688,763 issued Aug. 25, 1987 to Wakabayashi et al. is typical of these swing gear devices. The patent illustrates a swing gear attached to an arm which rotates so that the swing gear selectively engages a gear coupled to winding-up means and a gear coupled to rewinding means respectively.

Another U.S. patent which discloses a patent having a swing gear type of device is U.S. Pat. No. 2,906,184 issued Sep. 29, 1959 to W. Hennig et al. This patent discloses a gear mounted to a lever. The lever pivots so that the gear meshes with another gear during film advance. A spring, which insures mesh engagement between the two gears, is attached at one end to the lever and the other end to a frame.

PROBLEM TO BE SOLVED BY THE INVENTION

Swing gear devices similar to that described above can include many parts which can be difficult to assemble during the manufacturing process.

SUMMARY OF THE INVENTION

The present invention is directed to a film transporting apparatus comprising a bi-directional motor adapted to rotate in a first direction and a second direction opposite the first direction; a driving gear connected to the bi-directional motor and adapted to rotate in a first direction and a second direction in response to rotation of the bi-directional motor in its first direction and its second direction, respectively; a first gear; a displaceable gear coupled to the driving gear and adapted to rotate around said driving gear along a predetermined path between a first position disengaged from the first gear and a second position engaged with the first gear in response to the driving gear rotating in its first direction and its second direction, respectively; and means for controlling the rotation of the displaceable gear between the engaged and disengaged positions. The transport apparatus is characterized in that the controlling means includes means for creating a frictional force along the predetermined path to control the rotation of the displaceable gear around the driving gear along the predetermined path and to hold the displaceable gear in its engaged and disengaged positions.

The film transporting apparatus embodying the present invention provides a swing gear type device which has minimal parts which are easy to assemble. The tolerance variability between parts is minimal because of the fewer parts involved.

BRIEF DESCRIPTION OF THE DRAWINGS

Other advantages of the invention will become apparent from the following description taken in connection with the accompanying drawing wherein.

DETAILED DESCRIPTION OF THE INVENTION

Figure 1:
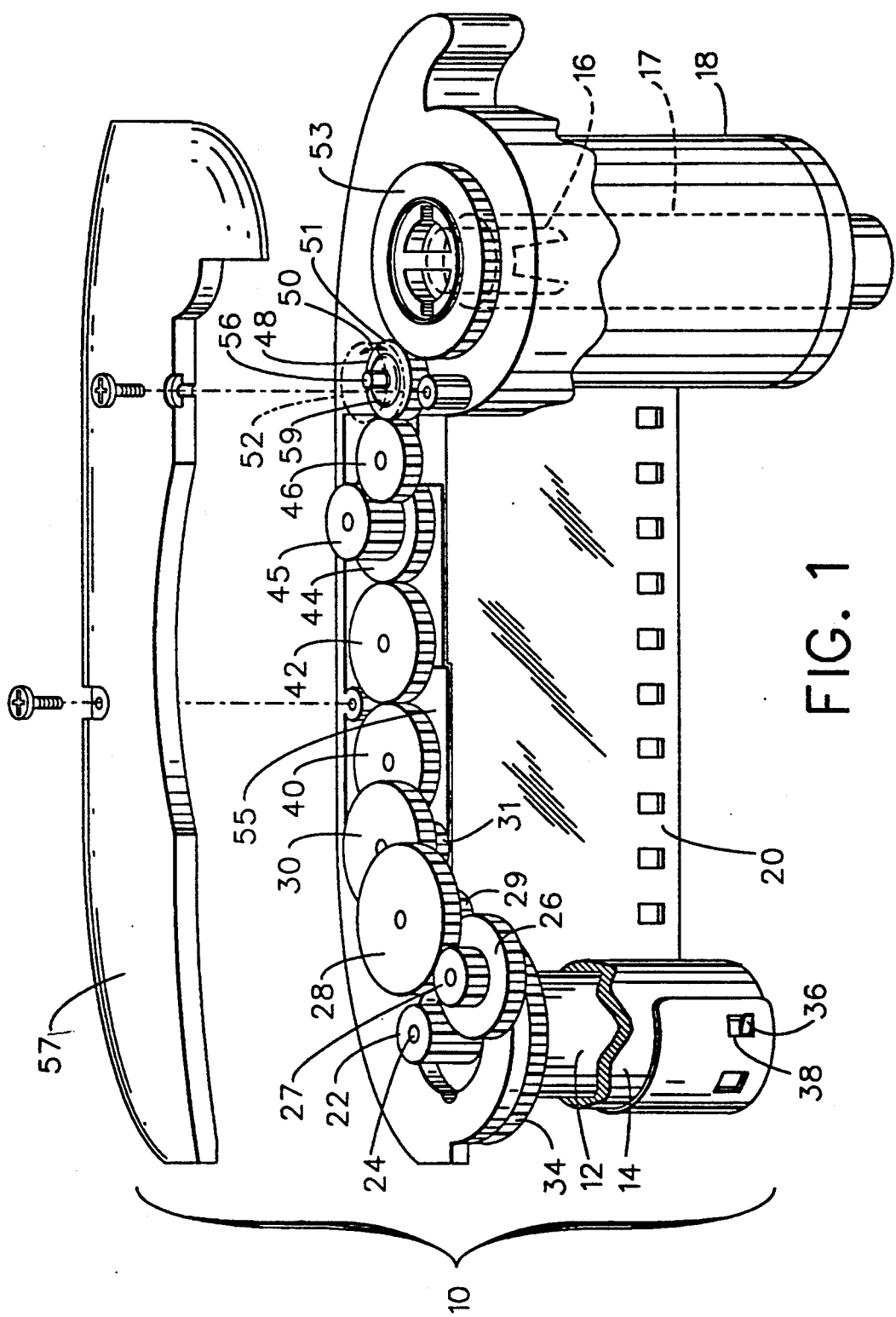
FIG. 1 is a perspective view of a film transporting apparatus embodying the present invention.

Referring now to FIGS. 1 to 4, a film transporting apparatus 10 is illustrated which includes a bi-directional motor 12 operatively connected to a take-up spool 14 and a spindle fork 16 coupled to a film spool 17 in a film cartridge 18. The bi-directional motor 12 is adapted to rotate in a first direction to wind a photographic film 20 onto the take-up spool 14 and to rotate in a second direction opposite the first direction to wind the photographic film onto the film spool 17 in the film cartridge 18. The bi-directional motor 12 is connected to a conventional control circuit (not shown) which is adapted to activate the bi-directional motor 12 and to cause the bi-directional motor 12 to rotate in its first and second directions.

Figure 2:
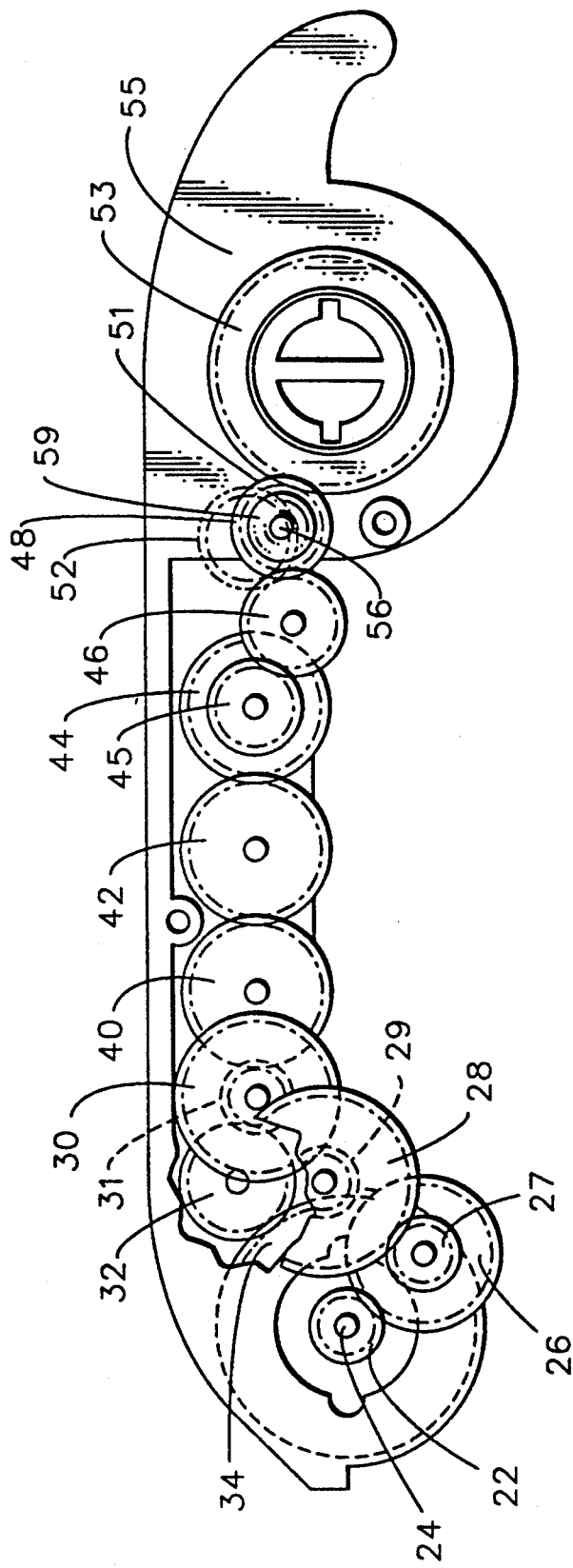
FIG. 2 is a plan view of the film transporting apparatus embodying the present invention illustrating a displaceable gear in an engaged and disengaged position with a first gear.

A motor pinion gear 22 is connected to a motor shaft 24. The motor pinion 22 is in mesh engagement with a gear 26 having an integral pinion gear 27 which is in mesh engagement with a gear 28. Gear 28 includes an integral pinion gear 29 which is in mesh engagement with a gear 30. A pinion gear 31 is made integral with the gear 30 and is in mesh engagement with a gear 32. Gear 32 is in mesh engagement with a take-up spool gear 34, as best illustrated in FIG. 2, attached to the take-up spool 14. This gear train causes the photographic film 20 to be wound onto the take-up spool 14 in response to the bi-directional motor 12 rotating in its first direction.

The take-up spool 14 can include any conventional means for capturing the photographic film 20. For example, at least one hook 36 projecting above the periphery of the take-up spool 14 engages a film perforation 38 in the photographic film 20.

According to a preferred embodiment of the present invention, the pinion gear 31 is also in mesh engagement with a gear 40, as best illustrated in FIG. 2, which is in mesh engagement with a gear 42. The gear 42 is in mesh engagement with a gear 44 having a pinion gear 45. The pinion gear 45 is in mesh engagement with a driving gear 46 which is in mesh engagement with a displaceable gear 48. The driving gear 46 is adapted to rotate in a first direction and a second direction in response to rotation of the bi-directional motor 12 in its first and second directions, respectively.

The displaceable gear 48 is adapted to rotate around the driving gear 46 along a predetermined path 50 between a first position 52 where it is disengaged from a first gear 53 and a second position 51 where it is in mesh engagement with the first gear 53 in response to rotation of the driving gear 46 in its first direction and its second direction, respectively. The first gear 53 is attached to the spindle fork 16 coupled to the film spool 17 in the film cartridge 18. The photographic film 20 is wound onto the film spool 17 in the film cartridge 18 in response to rotation of the bi-directional motor 12 in its second direction and movement of the displaceable gear 48 to its engaged position 51 with first gear 53.

The gears and pinion gears 26, 27, 28, 29, 30, 31, 32, 34, 40, 42, 44, 45, 46, 48, 53 are all spur gears supported by the gear plate 55. The gears are retained by a cover plate 57 fastened to the gear plate 55.

According to the preferred embodiment of the present invention, the predetermined path 50 is defined by a channel 66 formed in a housing or gear plate 55 and a channel 68 formed in the cover plate 57. The displaceable gear 48 includes a shaft 56 protruding above and below the displaceable gear 48. The protruding ends of the shaft 56 rotate within the channels 66, 68 and is confined by the channels as the displaceable gear 48 rotates around the driving gear 46.

The displaceable gear 48 may tend not to rotate around the driving gear 46 when the photographic film 20 is being transported by the film transporting apparatus 10 due to the load on the gear train. Therefore, in accordance with the present invention the film transporting apparatus 10 includes means 58 for controlling the movement of the displaceable gear 48 which applies a frictional force to the displaceable gear 48 so that the rotation of the displaceable gear 48 around the driving gear 46 along the predetermined path 50 can be reliably controlled when the photographic film 20 is being transported.

In the preferred embodiment, the controlling means 58 includes an interference fit between an elastic member 59 adapted to be attached to the displaceable gear 48 and means 60 located along one side of the predetermined path 50 for engaging and compressing the elastic member 59 which creates the frictional force needed to cause the displaceable gear 48 to rotate around the driving gear 46..

The elastic member 59 of the preferred embodiment includes a rubber o-ring placed in a recess 62 around the shaft 56 of the displaceable gear 48.

Figure 3:
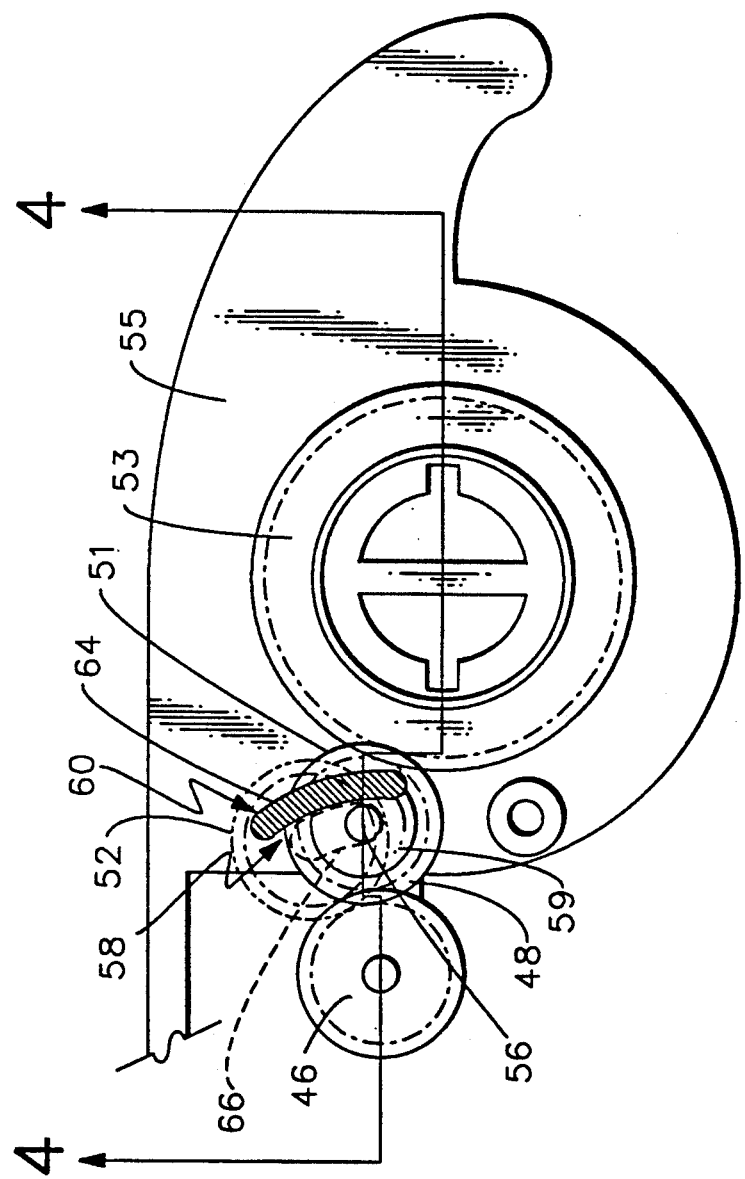
FIG. 3 is an enlarged view of a portion of the film transporting apparatus embodying the present invention.
Figure 4:
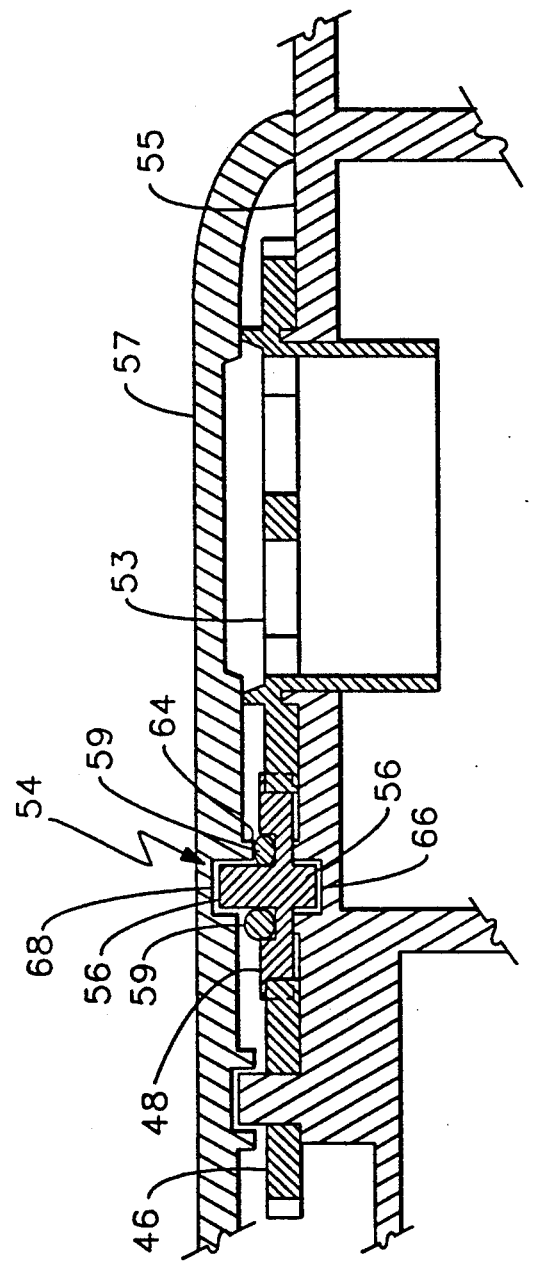
FIG. 4 is an elevational view, in section taken along lines 4—4 in FIG. 3.

The engaging and compressing means 60 includes a rib 64 protruding from the underside of the cover plate 57 located along one edge of the channel 68. The rib 64 is similar in shape to the predetermined path 50 of the displaceable gear 48, as best illustrated in FIG. 3. The rib 64 will engage and compress the o-ring when the cover plate 57 is fastened to the gear plate 55.

The engaging and compressing means 60 could include a retainer (not shown) fastened to the gear plate 55 which would engage and compress the elastic member 59 or any other member which would engage and compress the elastic member 59.

The frictional force created by the interference fit between the elastic member 59 and the rib 64 will reliably control the rotation of the displaceable gear 48 around the driving gear 46 along the predetermined path 50, and will hold the displaceable gear 48 in its engaged and disengaged positions 51, 52 thus preventing what is known as 'bootstrap'. 'Bootstrap' is a condition which occurs when the displaceable gear 48 and the first gear 53 are moving in a direction so that the gears 48, 53 are attempting to decrease the center distance, thus the gear train becomes locked in a non-operative condition. This can occur as the displaceable gear 48 begins to disengage from the first gear 53 but falls back into mesh with the freewheeling first gear 53.

Referring to FIGS. 1 to 4, the operation of the film transport apparatus will be described regarding the mode in which the photographic film 20 is wound onto the take-up spool 14. The control circuit activates the bi-directional motor 12 so that it rotates in its first direction. The motion of the bi-directional motor 12 is transmitted through the gears 22, 26, 27, 28, 29, 30, 31, 32 to the take-up spool gear 34. The hook 36 engages the film perforation 38 on the photographic film 20 and the photographic film is wound onto the take-up spool 14.

The motion of the bi-directional motor is also transmitted through the gears 31, 40, 42, 44, 45 to the driving gear 46 so that it rotates in its first direction and the displaceable gear 48 is in its disengaged position 52. The first gear 53 is freewheeling. The frictional force created between the elastic member 59 and the rib 64 acts to hold the displaceable gear 48 in its disengaged position 52.

Referring to FIGS. 1 to 4, the operation of the film transport apparatus will be described regarding the mode in which the photographic film 20 is wound onto the film spool 17 in the film cartridge 18. The control circuit activates the bi-directional motor 12 so that it rotates in its second direction. The motion of the bi-directional motor 12 is transmitted through the gears 22, 26, 27, 28, 29, 30, 31, 40, 42, 44, 45 to the driving gear 46 so that the driving gear 46 rotates in its second direction. The displaceable gear 48 rotates around the driving gear 46 along the predetermined path 50 to its engaged position 51. The frictional force created between the elastic member 59 and the rib 64 acts to reliably control the movement of the displaceable gear 48 towards its engaged position 51 and acts to hold the displaceable gear 48 in its engaged position 51 until the driving gear 46 begins rotating in its first direction. Motion of the displaceable gear 48 is transmitted to the first gear 53 which is attached to the spindle fork 16 coupled to the film spool 17. The photographic film 20 is wound onto the film spool 17 in the film cartridge 18.

A means for controlling the movement of a displaceable gear between two gear trains has been described which is reliable and prevents locking the gear trains in a non-operative state. The control means includes a minimal number of parts and is easy to assemble.

The present invention has been described in detail with particular reference to a preferred embodiment thereof, but it will be understood that variations and modifications can be effected within the spirit and scope of the invention.

I claim:

1. A film transporting apparatus comprises a bi-directional motor adapted to rotate in a first direction and a second direction opposite said first direction; a driving gear connected to said bi-directional motor and adapted to rotate in a first direction and a second direction in response to rotation of said bi-directional motor in said first direction and said second direction, respectively; and a first gear; characterized by:

a displaceable gear coupled to said driving gear and adapted to rotate around said driving gear along a predetermined path between a first position disengaged from said first gear and a second position engaged with said first gear in response to said driving gear rotating in its first direction and its second direction, respectively; and means for controlling the rotation of said displaceable gear between said engaged and disengaged positions, said controlling means including means for applying a frictional force to said displaceable gear, said frictional force applying means including an elastic member adapted to be attached to said displaceable gear and means located along said predetermined path of said displaceable gear for engaging and compressing said elastic member to apply said frictional force to said displaceable gear to control the rotation of said displaceable gear around said driving gear along said predetermined path and to hold said displaceable gear in said engaged and disengaged positions.

2. A film transporting apparatus as defined in claim 1, wherein said elastic member includes a rubber o-ring adapted to be attached to said displaceable gear.

3. A film transporting apparatus as defined in claim 1, further including a gear plate adapted to support said driving gear, said first gear and said displaceable gear; a cover plate fastened to said gear plate; and wherein said engaging and compressing means includes a rib protruding from said cover plate to engage and compress said elastic member to apply said frictional force to said displaceable gear to control the rotation of said displaceable gear around said driving gear along said predetermined path and to hold said displaceable gear in said engaged and disengaged positions.

* * * * *